United States Patent
Graham et al.

(10) Patent No.: US 8,317,886 B2
(45) Date of Patent: Nov. 27, 2012

(54) APPARATUS AND METHOD FOR GASIFYING SOLID ORGANIC MATERIALS

(75) Inventors: Robert G. Graham, Preque Isle, MI (US); Jan Barynin, Vancouver (CA); Kenneth M. Davison, Lake Country (CA); Dave Berner, Spruce Grove (CA)

(73) Assignee: Nexterra Systems Corp., Vancouver (CA)

(*) Notice: Subject to any disclaimer, the term of this patent is extended or adjusted under 35 U.S.C. 154(b) by 2303 days.

(21) Appl. No.: 10/704,095

(22) Filed: Nov. 7, 2003

(65) Prior Publication Data

US 2004/0107638 A1 Jun. 10, 2004

Related U.S. Application Data

(63) Continuation-in-part of application No. 10/154,328, filed on May 22, 2002, now abandoned.

(51) Int. Cl.
*C10J 3/00* (2006.01)
*B01J 7/00* (2006.01)

(52) U.S. Cl. ....... 48/101; 48/61; 48/76; 48/74; 48/62 A; 48/86 R; 48/203; 48/210; 48/111; 110/214; 110/229

(58) Field of Classification Search ................ 48/77, 61, 48/62 R; 202/84; 110/182.5; 264/30; 422/306
See application file for complete search history.

(56) References Cited

U.S. PATENT DOCUMENTS

| | | | | |
|---|---|---|---|---|
| 2,320,410 A | * | 6/1943 | Cheasley | 122/374 |
| 2,455,817 A | * | 12/1948 | Sherman | 110/190 |
| 4,184,436 A | | 1/1980 | Palm et al. | |
| 4,312,278 A | | 1/1982 | Smith et al. | |
| 4,321,877 A | | 3/1982 | Schmidt et al. | |
| 4,366,802 A | | 1/1983 | Goodine | |
| 4,430,948 A | | 2/1984 | Schafer et al. | |
| 4,593,629 A | | 6/1986 | Pedersen et al. | |
| 4,691,846 A | | 9/1987 | Cordell et al. | |
| 4,846,449 A | * | 7/1989 | Hauk et al. | 266/172 |
| 4,971,599 A | | 11/1990 | Cordell | |
| 5,026,403 A | * | 6/1991 | Michel-Kim | 48/203 |
| 5,138,957 A | | 8/1992 | Morey et al. | |
| 5,318,602 A | * | 6/1994 | Juch | 48/76 |
| 5,787,822 A | * | 8/1998 | Hilliard | 110/229 |
| 6,120,567 A | * | 9/2000 | Cordell et al. | 48/197 R |

* cited by examiner

*Primary Examiner* — Kaity V. Handal
(74) *Attorney, Agent, or Firm* — William W. Cochran; Cochran Freund & Young LLC (57) ABSTRACT

An apparatus and method for starved air gasification of solid organic materials, including biomass and other wastes, to convert the chemical energy stored in such materials to thermal energy or gaseous products that may be used in biochemical and/or chemical synthesis. Specifically, the system utilizes a gasifier having a "moving bed of ash" hearth wherein the feedstock is partially oxidized at a low temperature (less than 1500 degrees F.) in a square or rectangular chamber having a vaulted, tapered or flat roof.

17 Claims, 7 Drawing Sheets

APPARATUS AND METHOD FOR GASIFYING SOLID ORGANIC MATERIALS

This application is a continuation-in-part of U.S. application Ser. No. 10/154,328, filed May 22, 2002, now abandoned.

The invention disclosed and claimed herein deals with an apparatus and method for gasifying solid organic materials to convert the chemical energy stored in such materials to thermal energy or gaseous products that may serve in biochemical and/or chemical synthesis for further product development. More particularly, this invention relates to a method for gasifying biomass materials, such as forestry and agricultural residues, industrial waste materials such as saw mill pulp and paper products, hydrocarbon based plastics and the like. This invention also deals with the apparatus that is used to convert the chemical energy into thermal energy or gaseous products. Specifically, the invention utilizes a novel bottom supported gasification chamber unlike those found in the prior art, wherein the feedstock is partially oxidized at an elevated temperature in a square or rectangular gasification chamber. The advantages of using such gasification chamber are set forth infra, in the discussion. The high temperature gases produced by the practice of the invention are essentially void of particulate solids and can be utilized to advantage, for example, as the thermal energy source for a conventional steam generator or steam boiler, and the like.

BACKGROUND OF THE INVENTION

This invention is directed to an apparatus and method for gasifying solid organic materials to convert the chemical energy store in such materials to thermal energy or gaseous products that may serve in biochemical and/or chemical synthesis for further product development. The novel apparatus specifically relates to a new and novel gasification chamber.

It has long been recognized that many industrial and agricultural solid organic by-products, such as forestry and agricultural residue, and the like, are a potential source of large amount of chemical energy. The substantial increases in the cost of traditional fuels, such as fuel, oil and natural gas, which occurred during the 1970's, have provided substantial economic incentive to try to develop effective and efficient techniques for recovering the energy in these organic by-products, energy that traditionally was not recovered to any substantial extent. Such organic materials, frequently referred to as "biomass" materials, are now successfully utilized to some extent as fuel in some very large industrial systems, for example, in firing the power boiler and the recovery boiler in a pulp or paper mill. However the high capital cost that has heretofore been associated with biomass energy recovery systems has precluded their successful use in small or even medium size energy recovery systems. Medium size energy recovery systems, that is, of the size from about 4,000,000 to 8,000,000 BTU/hr., are used in community centers, schools, nursing homes, and small industrial and commercial establishments and, to date, biomass fuels have not been satisfactorily utilized as fuel in heating systems for such facilities. Among the U.S patents that have issued on inventions relating to the recovery of energy from wood chips or similar organic materials are for example, U.S. Pat. No. 5,138,957 that issued to Morey, et al. on Aug. 18, 1992; U.S. Pat. No. 4,184,436 that issued to Palm, et al. Jan. 22, 1980; U.S. Pat. No. 4,312,278 that issued to Smith, et al. on Jan. 26, 1982; U.S. Pat. No. 4,366,802 that issued to Goodine on Jan. 4, 1983; U.S. Pat. No. 4,321,877 that issued to Schmidt, et al on Mar. 30, 1982; U.S. Pat. No. 4,430,948 that issued to Schafer, et al. on Feb. 14, 1984; U.S. Pat. No. 4,593,629 that issued to Pedersen, et al. on Jun. 10, 1986; U.S. Pat. No. 4,691,846 to Cordell, et al. that issued on Sep. 8, 1987, and U.S. Pat. No. 4,971,599 that issued to Cordell on Nov. 20, 1990. However, it is not known that any of the inventions described in these patents have been successfully adapted to recover biomass energy on a cost-effective basis in small and medium size energy recovery systems.

Thus, gasifiers are not new in the art and there are many publications dealing with such pieces of equipment and systems in which they are used, but by way of illustration, attention can be directed to U.S. Pat. No. 4,691,846 that issued on Sep. 8, 1987 to Cordell, et al, in which there is described a method and apparatus for gasifying solid organic materials in which the system is described in detail with emphasis on the hopper and its manner of operation. It should be noted that the gasifier is shown and described as a dome-like structure with a bottom feed mechanism for the solid organic materials, and an upper exhaust system to remove the gaseous effluent to a secondary chamber.

A second disclosure can be found in U.S. Pat. No. 6,120,567 that issued on Sep. 19, 2000 to Cordell, et al in which there is described a method of gasifying solid organic materials and in which a similar apparatus and system as is disclosed in the '846 patent is set forth. The '567 patent is related to the '846 patent. Again, it should be emphasized that the gasifier is shown and described as a dome-like structure having a bottom feed and an upper exhaust for the gaseous effluent.

The major concerns with these early devices and systems is that the primary gasification chamber cylindrical and is therefore severely limited in the manner of construction to accommodate large volumes of through-put without consuming larger areas of floor space. Another concern is the need to dump ash on a continuous basis to avoid swings in the chemical composition of the producer gas. Moreover, the gasifier of the prior art does not have any basins and thus it is impractical to build up and maintain a hearth.

SUMMARY OF THE INVENTION

In accordance with the present invention, there is provided a relatively simple method for the recovery of energy from feed stock of forestry and agricultural residues, such industrial waste materials such as pulp and paper products, hydrocarbon based plastic, and the like, by the gasification of such materials within the inventive gasifier and employment of the system disclosed herein. The method, apparatus and system according to the present invention can be utilized on a cost-effective basis, due to the relatively low capital cost of the apparatus, to cleanly and efficiently recover energy at medium rates of recovery, and even at very low rates of recovery.

The apparatus according to this invention utilized a cubic or hexagonal, vaulted, bottom supported enclosure, the gasifier wherein the feed stock is partially oxidized at controlled reduced temperatures (less than 1500 degrees F.) in a process in which it first gasifies and chars, preferably in a deficiency of oxygen, producing a high temperature combustible effluent which may be provided a secondary oxidation in an oxidizer. The high temperature effluent from the oxidizer can be utilized as a thermal energy source, for example, in an otherwise conventional heat exchanger such as a steam boiler as a substitute for the combustion effluent from the fuel oil or gas burner that is normally utilized in conjunction with a boiler of such type, or alternatively, the combustible effluent from the gasifier may serve as feed stock for upgrading a chemical or biochemical process.

During normal operation, the feedstock is mechanically fed to the gasifier from a storage hopper by means of screw feeding system, preferable automatically in response to the demand for energy from the system. Details of this feeder system design and its function is set forth and described in U.S. Pat. No. 6,120,567, which is incorporated herein by reference for what it teaches about the feeder system design and function and the apparatus and system in general, with the exception of the gasifier.

The gasifier is provided with a hearth that is comprised of a moving bed of ash on which the oxidation takes place in form of a burning pile with the fuel feed entering up through the hearth through a set or sets of feed cones. The "moving bed of ash" hearth is provided with augers for removing ash and non-combustible contaminants, such as sand, dirt, stones, rocks and any slag that is formed, from the chamber. The burning pile is also used to control the elevation and shape of the "moving bed of ash" hearth.

While the feed stock oxidation method according to the present invention has wide industrial usage, it can also be utilized to particular advantage in remote regions, where winters are long and cold, conventional fuels are expensive, and occasionally scarce, because of the long delivery distances from remote major population centers, and where biomass feed stocks are plentiful and inexpensive as a result of the agricultural and/or forest-base business activities that are frequently conducted in such regions.

The essential feature of this invention is a gasifier of cubic or other hexahedral shape featuring, respectively, square or rectangular hearth patterns with a bottom portion, and a converging upper vaulted, tapered or flat roof. The gasifier features a "moving bed of ash" hearth design by which the formed ash and other solids of combustion residue accumulates on the bottom of the gasifier floor and thus creates and builds up and forms the hearth on which oxidation proceeds.

In the preferred embodiment, there is at least one trench provided in the gasifier floor featuring one or more devices for removal of ash and combustion residues and for control of the elevation and shape of the "moving bed of ash" hearth. A most adaptable device is an auger. In an example, there are two trenches, one on either side of a centrally located feed cone or feed trough. The ash augers in the trenches move the ash towards points of discharge suitably located at the end or bottom of the trench. The trenches are connected to a bin or a conveyor of suitable design for further disposal of the ash. Alternatively, the control of the "moving bed of ash" hearth level and the removal of the ash can be accomplished by a conveyor or conveyors moving across the entire floor, or section thereof, from side to side, or end to end of the gasifier as deemed most suitable for the dimensions and shape of the "moving bed of ash" hearth, or alternatively, a set, or sets, of dump grates can be inserted under the "moving bed of ash" hearth to facilitate and control removal of the ash.

As indicated supra, there is a gasifier with one or several feed cones arranged along the centerline of the chamber and protruding above the general elevation of the "moving bed of ash" hearth. Each feed cone is serviced by a single, or twin set, of fuel feed augers entering vertically, or sloped, from below. Alternatively, for the "moving bed of ash" hearth having conveyors moving across its surface, as described in supra, the feed is distributed across the chamber floor by the conveyors from a feed bin attached to the front of the gasifier, and dragged onto the hearth, or a spreader stoker may distribute the feed across the hearth.

In the gasifier, partial primary oxidation is carried out as a moderately slow pile burning or, in the case of multiple feed cones, as multiple pile burnings. The method is one in which the combustion is carried out sub-stoichiometrically with the application of an oxidizing agent, which typically will be air, oxygen or a mixture hereof, wherein the solid organic materials are transferred continuously or intermittently to the gasifier at a predetermined rate to maintain a mass of solid organic materials in the gasifier, and further wherein the oxidant is continuously added to the gasifier to continuously gasify the solid organic materials in the mass, and still further the solid residue is transferred out of the gasifier. A preheater may be used to raise the temperature of the oxidizing agent. The oxidizing agent is administered through a set or sets of suitable ducts connected to nozzles and injection points located within, around and between the feed cones, and to row, or rows of nozzles and/or tuyeres in the surrounding walls of the gasifier.

As the oxidation proceeds and the temperatures elevate the fuel will pyrolyze and gasify. By starving the combustion of oxygen, a "product gas" rich in combustible gaseous components is formed. The moderately slow burning will serve to establish a quiet oxidation zone whereby entrainment of particulate matter and fly ash is minimized. "Product gas" with a maximum of combustible gaseous components and a minimum of particular matter is one key objective of this invention. The "product gas" may, however, contain a pyrolytic aerosol or mist of submicron particles or droplets of liquid tar and other high molecular weight components that should be eliminated.

There is provided a recovery and regeneration apparatus (chamber) in which the aerosols and other components of the "product gas" under the effect of high gas temperature and extended residence time will decompose, separate and/or convert into combustible gaseous products thereby enriching the value of the "product gas".

To further enrich the "product gas", heating the "product gas" to a temperature regime in the range of 1800-2200° F. by auxiliary means provides certain residual inert components in the "product gas" that convert into combustible gaseous products that further increase the value of the "product gas". As a means to this end the recovery and regeneration apparatus is fitted with a set, or sets, of nozzles for injection of an oxidizing agent to quickly raise the temperature to the temperature regime.

Where "product gas" is the desirable product from said invention, it is critical to cool by quenching the "product gas" rapidly to temperatures well below 1400° F. rather than letting it linger at elevated temperatures as leaving the "product gas" at elevated temperatures could lead to a degradation of the value of the "product gas". The inventive process can be extended to incorporate a quenching apparatus (not shown) whereby a surplus of quenched "product gas" is recycled and used as the quenching medium, thereby reducing the "product gas" temperature to 400° F. or lower.

In the event that "product gas" is not the desired product from the inventive process, then essentially all "product gas" is fully oxidized or combusted, so as to raise the resulting flue gas temperature to the maximum. This is accomplished by introducing an oxidizing medium such as air into the recovery and regeneration chamber. A heat exchanger may be used to preheat the air.

The oxidizer of this invention is preferred to have a cylindrical configuration to ensure complete oxidation of the "product gas" and this device is positioned immediately downstream of the recovery and regeneration chamber. A heat exchanger may be located immediately after the oxidizer. As an example, a natural gas-fired, ceramic type heat exchanger would serve in this function.

DETAILED DESCRIPTION OF THE INVENTION

Figure 2:
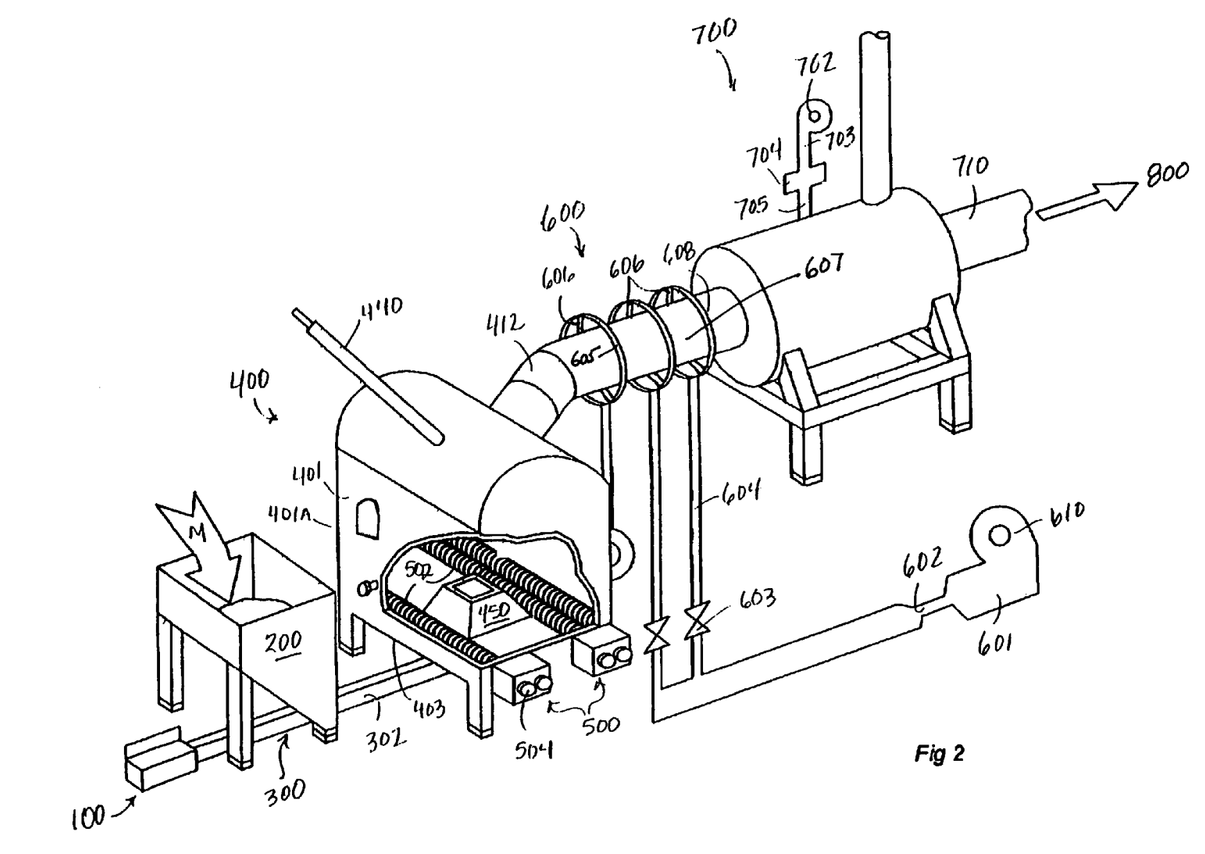
FIG. 2 is a perspective view of the inventive gasification system illustrating the fuel storage hopper, the inventive gasifier with a partial cut-away sidewall showing the interior of the gasifier unit, the combustion gas recovery and regeneration chamber, and the oxidizer.

Turning now to the specific details of the invention, and with reference to FIG. 2, there is shown a system for practicing the present invention which utilizes a drive assembly, indicated generally by reference number 100, a storage hopper assembly, indicated generally by reference number 200, a feed assembly, indicated generally by reference the number 300, which is driven by the drive assembly 100 and which feeds material from the storage hopper assembly 200 into a gasifier 400 wherein primary substoichiometric oxidation of the feed material occurs. The un-oxidized or unburned portion of the feed material fed into gasifier 400 is withdrawn from the bottom of the gasifier 400 and transported away by a clean-out assembly, indicated generally by reference number 500 and, in the preferred embodiment of the invention, the material fed into the gasifier 400 is only partially oxidized therein. There is provided a recovery and regeneration chamber indicated generally by reference number 600 which receives the gaseous partially oxidized feed material from gasifer 400, followed by an oxidizer 700 wherein secondary oxidation, or completion of oxidation, of the partially oxidized feed material occurs. The fully oxidized gaseous material from the secondary oxidation chamber, or oxidizer 700, may be used as a source of heat energy in a device which requires heat energy, and in the preferred embodiment of the present invention this takes a form of an otherwise conventional steam boiler, indicated generally by reference number 800. However, it is understood that other heat recovery devices may be substituted for steam boiler 800, including, but not limited to, heat exchangers and air turbine systems.

Alternatively, the partially oxidized gaseous material ("product gas") withdrawn from the recovery and regeneration chamber 600 may bypass oxidizer 700 without further oxidation to be used as feed for a chemical or biochemical synthesis to develop valuable products such as alcohols or other organic derivatives, and in the preferred embodiment of the present invention, this takes the form of a conventional process routing known in the art, indicated generally also by reference number 800.

The material which is to be oxidized in the apparatus of FIG. 1 is delivered to the storage hopper assembly 200 in any suitable manner, for example, manually from a pile of such material or by means of a conveyor, not shown, from a self-unloading truck body of an appropriate type, also not shown, or in any other suitable manner known in the art. In FIG. 1, the transfer of the material into the storage hopper assembly 200 is indicated by a broad arrow with reference letter M.

The feed material which is delivered into the storage hopper assembly 200 may be any of the wide range of solid, organic materials of a type which is frequently referred to as waste materials, and suitable materials of this type include coal and coal tailings, petroleum coke, wood chips, sawdust, bagasse, news print, plastics, and the like. They may also include semi-solid organic materials such as sludges. These materials are usually waste by-product materials from various agricultural, forest, or industrial origins, and contain substantial amounts of chemical energy that is capable of being converted to thermal energy by suitable oxidation processes. Such materials are, however, difficult to handle because they are usually moist, almost always soiled, and are non-uniform or irregular in shape, and heretofore it has been difficult to efficiently and effectively oxidize because of their high moisture content, their non-uniform physical and chemical composition, and their frequent contamination with non-gasifiable materials, such as sand, dirt, rocks, stones, and other debris.

Figure 1A:
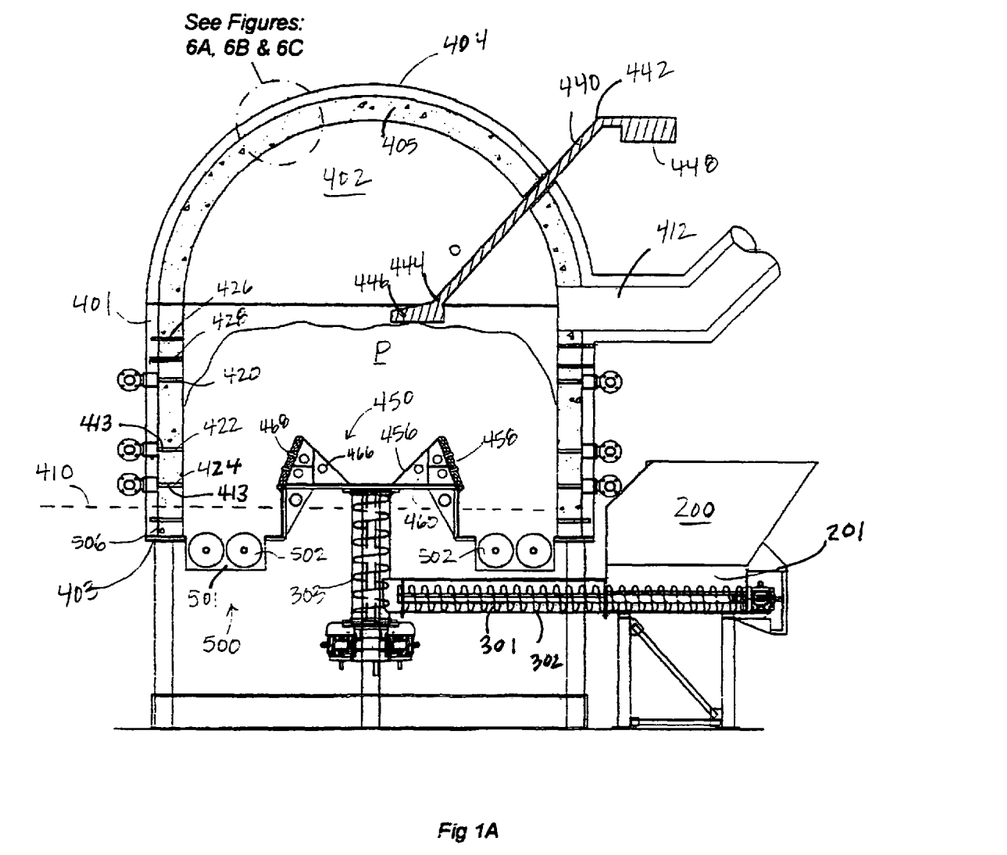
FIG. 1A is a side sectional view of the inventive gasifier illustrating the central fuel feed cone, the ash auger pair within a rectilinear ash hopper, and the air outlet duct positioned at the side of the unit.

As noted above, the feed material from the storage hopper assembly 200 is oxidized to a gaseous state in gasifier 400, preferably to a state which is not fully oxidized. Referring now to FIG. 1A, gasifier 400 is defined by four vertical side walls 401, giving the chamber a square or rectangular cross section and an enclosure 402 which has an irregularly shaped bottom 403 and which has at its top a domed roof 404, which in cross section may be vaulted, tapered or flat or any combination hereof.

Figure 6A:
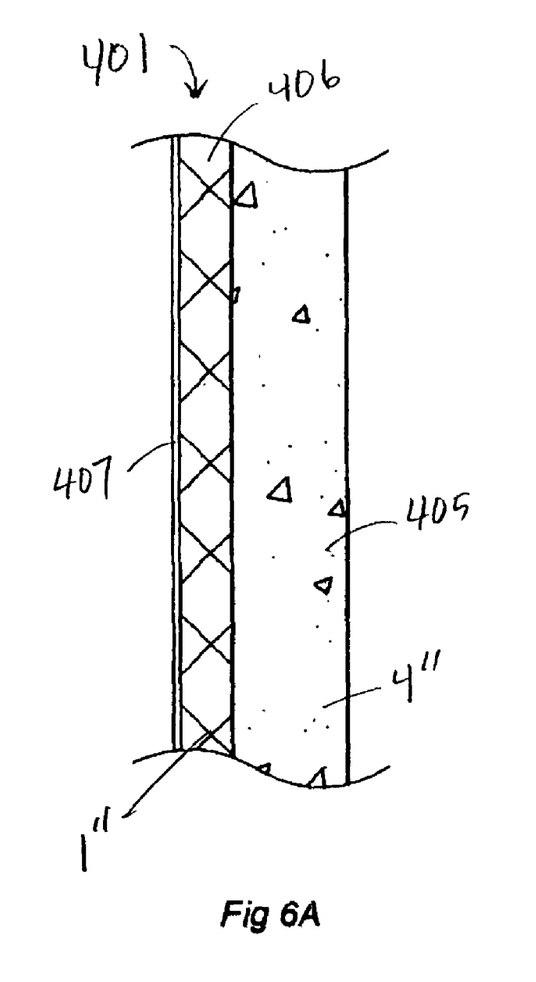
FIG. 6A is a partial side sectional view of the detail portion of FIG. 1A illustrating a first possible layered sidewall construction consisting of a steel shell spaced apart from the refractory lining, the space between the shell and lining filled with insulation.

Wall 401 is made up of a multiplicity of layers. In the preferred embodiment (FIG. 6A), the innermost layer 405 is an insulating layer of a high-temperature resistant type refractory that is capable of withstanding the elevated temperatures that will develop within gasifier 400, for example, temperatures in the range of approximately 2300° F. to approximately 2500° F., and that is capable of withstanding the operational temperature variations as well as the corrosive, erosive effects of the gaseous materials produced by the oxidation of the biomass feed material that is delivered into gasifier 400. Wall 401 may also include an insulating layer 406 on the outside of the wall layer 405 to further prevent loss of heat through the wall 401 of gasifier 400. As example, the insulating layer 406 may be a single layer of insulating firebrick, block insulation, or blanket insulation. The outer casing of the wall 401 is a structural layer, or shell 407 of sheet metal, for example, plate steel, which is airtight and provides the necessary strength and rigidity for the wall.

Figure 6B:
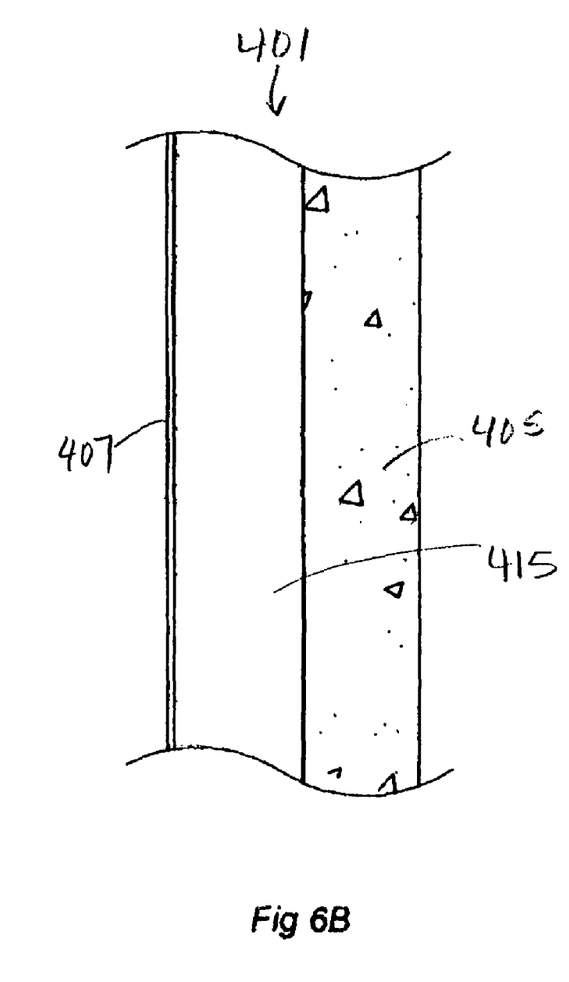
FIG. 6B is a partial side sectional view of the detail portion of FIG. 1A illustrating a second possible layered sidewall construction consisting of a steel shell spaced apart from the refractory lining, the open space between the shell and lining providing insulation for the shell, and providing a means of cooling the exterior wall and preheating air for use within the gasifier unit.

A second embodiment of wall 401 is shown in FIG. 6B, wherein insulating layer 406 is not used, and a vacant layer or space 415 is provided between refractory innermost layer 405 and steel shell 407. The air which fills vacant layer 415 acts as an insulator between refractory layer 405 and steel shell 407. This warmed air can also be used as a source of preheated air for injection into gasifier 400, recovery and regeneration chamber 600, and/or oxidizer 700.

Figure 3:
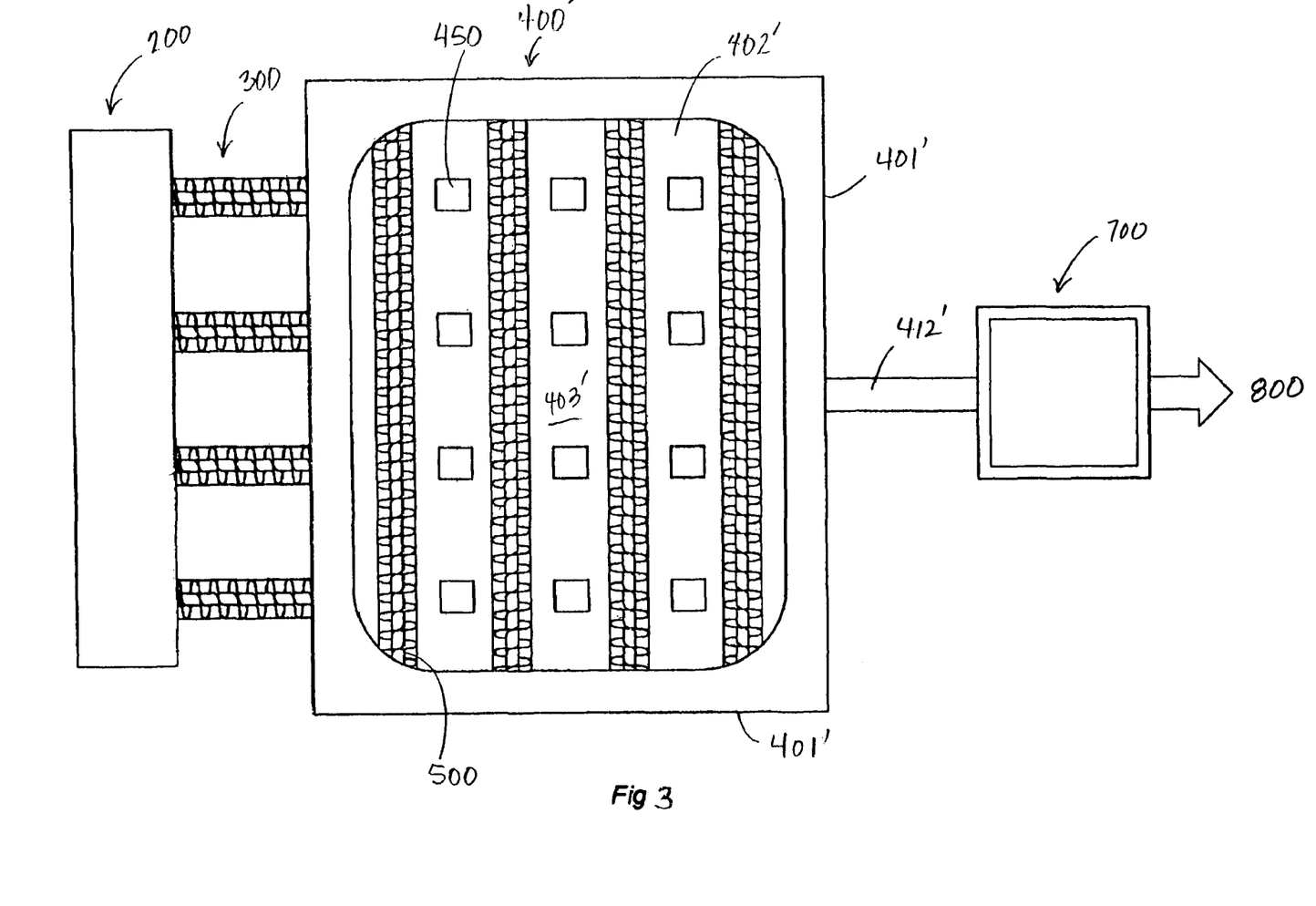
FIG. 3 is a schematic view of the inventive gasification system modified to accommodate increased capacity illustrating an enlarged gasifier, wherein the gasifier has been extended in both directions to provide increased output.

The biomass feed material from the storage hopper assembly 200 is introduced into gasifier 400 from below gasifier 400 through at least one feed cone 450 located along the centerline of bottom 403 of gasifier 400. During normal operating conditions, as is illustrated in FIG. 3, the feed material rises over the top of the feed cone(s) 450 and it rests on the hearth 410. Hearth 410 is made up of ash and other solid combustion residues, until it forms a pile of such material, indicated generally by reference letter P, which is the normal or equilibrium condition of gasifier 400. This self-generated hearth 410 is the "moving ash bed" configuration that is an essential part of this invention. As primary oxidation progresses, this bed continues to elevate and the ash must be removed at the same rate it is formed to maintain the appropriate fuel pile height.

The control of pile height and shape is of critical importance for combustion control and the release of gaseous combustibles, i.e., the "product gas". The shape and location of feed cone(s) 450 are designed to provide a pile having a generous depth, and which has a generally flat upper periphery. This flat, mesa-like upper surface extends over 60 to 70 percent of the floor area, generally filling the lower portion of gasifier 400, and sharply tapers downward adjacent walls 401. This downward taper, referred to as the angle of repose, is dependent upon the type of fuel used. A flat fuel pile is key to achieving uniform combustion without bridging. This flat configuration results in a uniform pile depth, which in turn results in uniform air pressure within the pile, thus minimizing channeling of the pile. Maintaining pile depth is very important. 12 to 18 inches of ash is maintained below the actively burning portion of the pile so as to prevent heat damage to feed cone 450 and ash clean-out assembly 500.

As the feed material in the Pile P in gasifier 400 moves from the bottom to the center and top of the mass, it gets hotter and hotter, and volatile components in such material and combustion products begin to dissipate from the surface of the pile, partly being assisted by the air which is rising through such material. As the feed material in the pile P loses more and more of the volatile and pyrolytic ingredients it will begin to form high molecular weight carbonaceous derivatives and char until, eventually, it is exposed to the full operating temperature inside gasifier 400. This material moves generally horizontally outward and then downward toward the outer wall and lower floor where it is exposed to further oxidation agents (via tuyere arrays 422, 424, described below) for a more complete reaction, at which time all of the organic constituents of such feed material will gasify and will pass from gasifier 400 as an incompletely oxidized gaseous effluent of combustibles, the effluent leaving gasifier 400 through an insulated exit duct 412. The velocity of the effluent above the fuel pile and out the exit duct will be low, reducing particulate carryover.

Figure 1B:
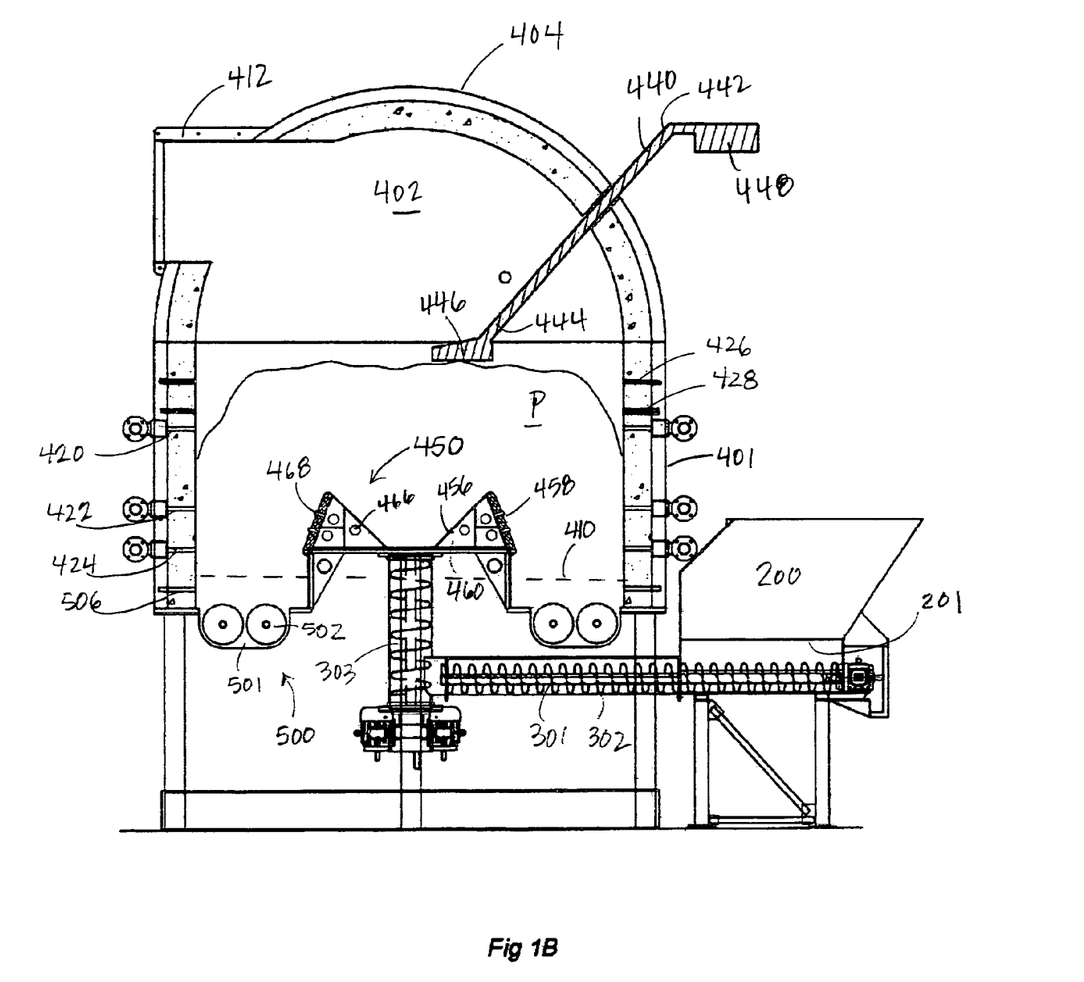
FIG. 1B is a side sectional view of the inventive gasifier illustrating the central fuel feed cone, the ash auger pair within a curvilinear ash hopper, and the air outlet duct positioned tangentially to the top of the dome.

In FIG. 1A, exit duct 412 is positioned so that it vents gasifier 400 through side wall 401, located adjacent domed roof 404 and above start-up tuyeres 420 (discussed below). In FIG. 1B, exit duct 412 is positioned to tangentially intersect the upper portion of domed roof 404. Preferably, side walls 401 are provided in a height which allows any air-borne particulate to fall back to pile P rather that exit via duct 412. The positioning of exit duct 412 within gasifier 400 can be either as shown in FIG. 1A or 1B, may be sloped or vertical, and is selected to be practical and suitable for the specific application.

The oxidation of the feed material in the pile P proceeds more satisfactorily if the amount of feed material in the mass M of feed material is maintained at a relatively constant value. Feed rate into gasifier 400 is monitored and controlled by monitoring and controlling fuel pile height within gasifier 400. Suitable instrumentation, not shown, is provided to control the rate of the delivery of the feed material into gasifier 400 by the feed assembly 300 as a function of the elevation of the top of the feed material in the height of pile P to maintain such elevation at a substantially constant value, and thereby to contain the pile P of feed material at a substantially constant shape In the preferred embodiment, pile height is monitored using a pair of infrared light beam and sensor units 426, 428. Infrared light units 426, 428 are embedded in side wall 401 such that they are spaced apart and in vertical alignment. Upper infrared light unit 426 is positioned approximately 12 inches above the desired pile height. Lower infrared light unit 428 is positioned at the desired pile height. When the height of the pile is too high, an upper infrared beam generated by upper infrared light unit 426 is interrupted, and upper infrared light unit 426 sends a signal to a controller which results in a slowing of the feed rate (for example, by slowing the rate of turn of the feed auger). When the pile height decreases to the extent that a lower infrared beam generated by the lower infrared light unit 428 is not interrupted, lower infrared light unit 428 sends a signal to a controller which results in an increased feed rate.

Alternative non-intrusive instrumentation may be used to monitor and control pile height. Such instrumentation includes, but is not limited to, instrumentation for measuring amperage of the vertical feed auger drive, described infra, nuclear density gauge technology, or thermocouples.

Figure 1C:
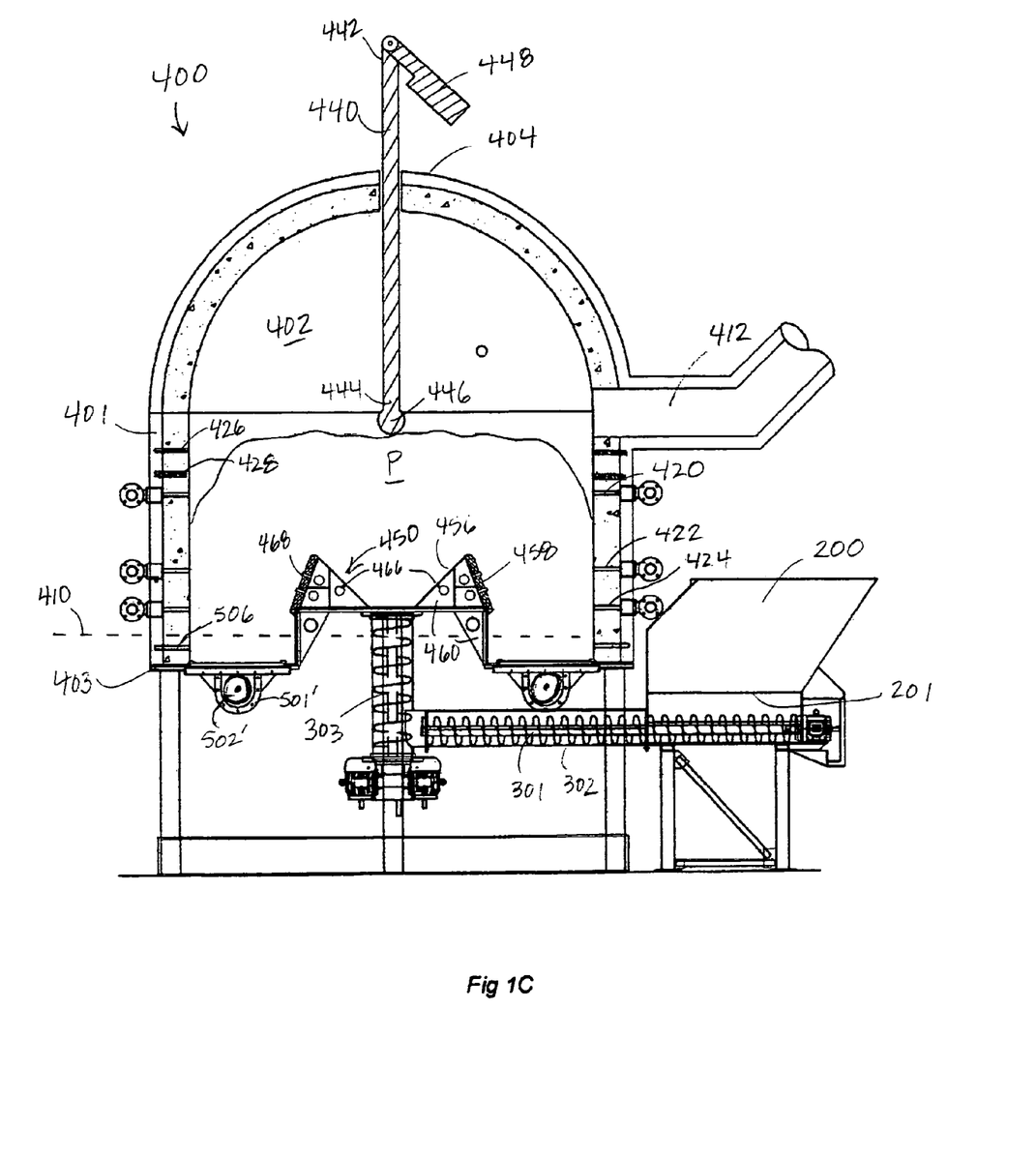
FIG. 1C is a side sectional view of the inventive gasifier illustrating the central fuel feed cone, a single ash auger within a curvilinear housing, and the air outlet duct positioned tangentially to the top of the dome.

A mechanical probe 440 may be employed as an alternative to the infrared or nuclear density gauge sensor units, or as a redundant monitoring system along with those systems. Mechanical probe 440 is retractable, and consists of an elongate rigid rod. Probe 440 has a first end 442 that resides outside gasifier 400, and a second end 444 that resides within gasifier 400. Second end 444 terminates in a flat plate or foot 446. Second end 444 rests upon the upper surface of the pile at a location spaced apart from side wall 401, with foot 446 maintaining second end on the surface and preventing it from sinking into the pile itself. In the preferred embodiment, probe 440 enters gasifier 400 through a lower portion of the dome (FIGS. 1A, 1B). However, it is within the scope of this invention to position probe 440 such that it enters other portions of the dome, such as along the vertical centerline of gasifier 400 (FIG. 1C). First end 442 is provided with a counterweight assembly 448 which maintains foot 446 in contact with the pile surface, and also includes sensors which signal changes to fuel feed rate depending on the angle of probe 440. The foot 446 may be raised intermittently, manually or automatically, to ensure that its level indication is faithful, and that foot 446 is not embedded in pile P. Retractable probe 440 is preferably formed of ceramic, providing a long wearing, heat tolerant apparatus. Alternatively, retractable probe 440 is internally cooled by circulating air or water to function satisfactorily in the high temperature environment of gasifier 400.

With primary reference to FIGS. 1 and 3, there is shown therein that the feed is brought to the pile P from the feed bin 200 by the screw conveyor 302 that will transfer its load to the pile screw 303, or screws which will enter the primary oxidizer 400 from below at a slanted or vertical angle. As an additional alternative means of controlling fuel pile height, a sensor which monitors the electrical load on the motor that drives pile screw or screw members 303 may be used. Because the electrical load on this motor increases as pile height increases due to the increased weight of the pile overlying screw or screw members 303, such a sensor can be used to monitor pile height and control feed rate.

The storage hopper assembly 200 has an elongate opening 201 in the bottom thereof, and the elongate opening 201 is longitudinally aligned, more or less, with a horizontal screw member 301 of the feed assembly 300, with the horizontal screw member 301 being disposed immediately below the elongate opening 201 of the storage hopper assembly 200. The feed assembly 300 may also include a tubular housing 302 which surrounds the horizontal screw member 301, except the portion of the horizontal screw member 301 which is in communication with the elongate opening 201 of the storage hopper assembly 200. The horizontal screw member 301 of the feed assembly 300 is rotated by the drive assembly 100, to advance the feed material from the storage hopper assembly 200 through the tubular housing 302 to gasifier 400. Feed assembly 300 includes a second screw member 303, or twin set of screw members 303, which are disposed in a vertical orientation and which serve to vertically transfer feed material from the end of the horizontal screw member 301 upwardly into gasifier 400. The portion of tubular housing 302 about screw member 303 is provided with a greater inner diameter than the portion surround screw member 301. Preferably, the horizontal screw member 301 intercepts the vertical screw member 303 at a location spaced from the center line of vertical screw member 303. This configuration allows the feed material being advanced by the horizontal screw member 301 to constantly accommodate a change in direction and thickness of the passage through which it is traveling, preventing jamming of the feed material within the tubular housing 302, a phenomenon which can prevail if the feed material is unusually moist or stringy. Screw conveyor 302 and pile screw 303 may both feature progressive pitch where the diameter, the speed of rotation, and/or the distance between the helical flights will progressively increase with each flight in the direction of flow.

Figure 4:
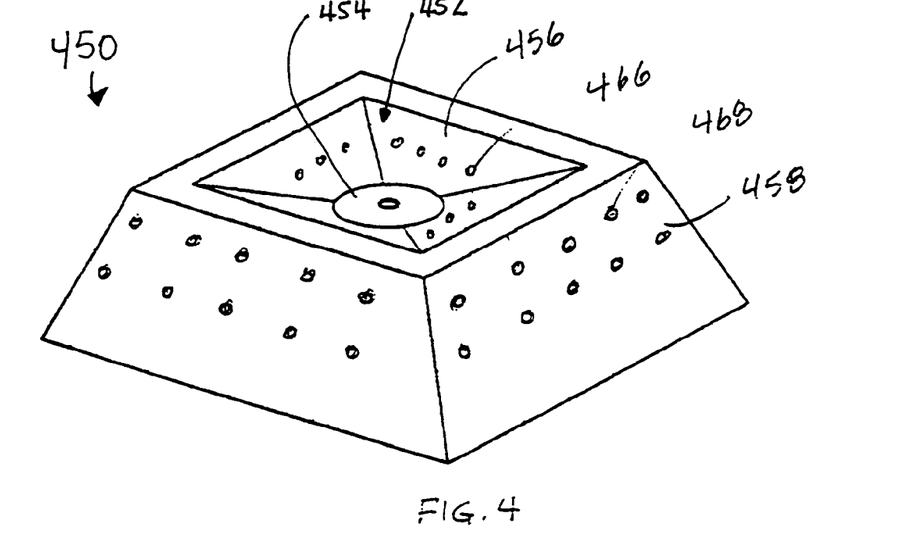
FIG. 4 is a perspective view of a feed cone in the shape of a hollow inverted truncated pyramid, illustrating tuyere placement on the inner and outer surfaces of the feed cone.
Figure 5:
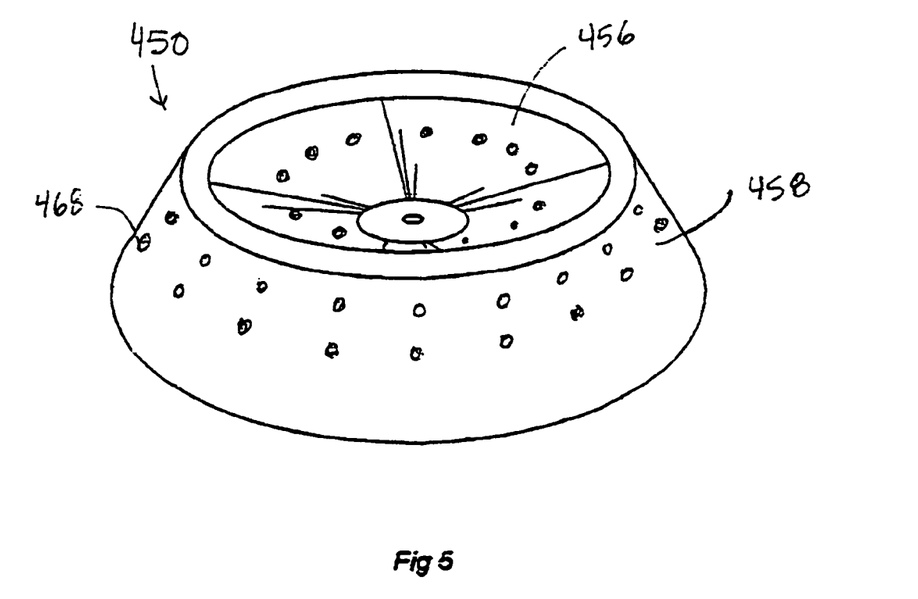
FIG. 5 is a perspective view of a feed cone in the shape of a hollow inverted truncated cone, illustrating tuyere placement on the inner and outer surfaces of the feed cone.

The shape of feed cone(s) 450 may be described as that of a tapered channel wherein a wide upper opening overlies and is in vertical alignment with a narrow opening. More specifically, feed cone 450 is a hollow inverted truncated four or multi-sided pyramid, or alternatively, a hollow inverted truncated cone, such that the wide, open base overlies a narrowed opening below it. A pyramid-shaped feed cone 450 comprises a square upper opening 452 vertically aligned with circular lower opening 454. Pile screw 303 terminates at lower opening 454, and lower opening 454 is sized to receive pile screw 303 therein with minimal clearance. When a conical-shaped feed cone 450 is employed, upper opening 452 is circular rather than square. Regardless of peripheral shape, feed cone 450 is provided with an angled inner surface 456 providing an upwards flaring and progressive widening in order to prevent packing of the feed and facilitate the distribution of the feed as it reaches the top of the feed cone 450. The angle of inner surface 456 is imperative for the formation and shape of the pile P and may range from 35 to 55 degrees, and is selected depending on the type of feed stock being injected into the primary oxidizer chamber 400. This angle is a well tested critical requirement of this invention. In the preferred embodiment, this angle is 45 degrees. An inner surface 456 angle of 45 degrees ensures a fuel pile where fuel is distributed evenly in all sloped directions, and also generates the desired flat pile surface. Inner surface angles which are more, or less, generate peaked or convex pile surfaces. The angle of the outer surface 458 of feed cone 450 is less critical, but must be relatively steep, for example 60 to 90 degrees to the horizontal, to prevent stagnation of flow or bridging and to ensure proper flow of the fuel pile.

The oxidation in gasifier 400 is carried out as a moderately slow pile burning or, in the case of multiple feed cones, as multiple pile burnings. In all cases the oxidation will be carried out sub-stoichiometrically with the application of an oxidizing agent, which typically will be air, oxygen or a mixture thereof. The oxidizing agent will be administered through a set, or sets, of suitable ducts or manifolds connected to nozzles and injection points located within, around and between the feed cones and to at least one array of tuyeres in the surrounding walls 401 of gasifier 400.

A plenum 460 exists in the hollow vacancy between inner surface 456 and outer surface 458 of feed cone 450. Plenum 460 may be a single open space, or alternatively may be compartmentalized for example as shown in FIGS. 1A, B, C. Air supply pipes 426 provide a source of injection air to plenum 460, which in turn supplies tuyere arrays formed in inner 456 and outer 458 surfaces. In the preferred embodiment at least one set of tuyeres 466 is provided in inner surface 456, and at least one set of tuyeres 468 is provided in outer surface 458. In the most preferred embodiment, at least two sets of tuyeres 468 are provided in outer surface 458. Preferably, feed cone tuyeres 466, 468 inject air into pile P in a direction perpendicular to the respective inner and outer surfaces 456, 458. Alternatively, feed cone tuyeres 466, 468 may be directed generally horizontally. Air is injected into pile P via feed cone tuyeres 466, 468 at all times, and air flow rate is controlled by adjustment of air pressure to these tuyeres.

In the preferred embodiment, there are three tuyere arrays provided in side walls 401. The first array is a horizontally oriented row of tuyeres referred to as the lower perimeter tuyeres 424. Typically, lower perimeter tuyeres are coplanar with lower opening 454 of feed cone 450, and inject air into lower and outer portions of pile P. The second array is a horizontally oriented row of tuyeres referred to as the upper perimeter tuyeres 422. Typically, upper perimeter tuyeres are approximately coplanar with the upper edge of feed cone 450, and inject air into outer portions of pile P at approximately mid-depth of the pile. The third array is a horizontally oriented row of tuyeres referred to as start up tuyeres 420. Start up tuyeres 420 are the uppermost set of side wall tuyeres, and are positioned above the outermost peripheral edge of the fuel pile, and below the flat fuel pile upper surface or mesa. Start up tuyeres 420 inject air into gasifier 400 only during initial start up of the unit or during transitory system upsets. Once fuel pile combustion is established, start up tuyeres 420 are shut off. In this preferred embodiment, only three sets of tuyere arrays in side walls 401 are described. However, it is well within the scope of this invention to add additional tuyere arrays, for example adjacent the ash removal system 500, as required by the specific application.

Side wall tuyeres 420, 422, 424 can be advantageously formed out of metal pipe, for example, ¾ or 1¼ inches in diameter, and these pipes are embedded in the innermost layer 405 at the time it is cast, preferably to the extent of approximately one-half of the outside diameter of each of the metal pipes. While the metal pipes that make up the side wall tuyeres 420, 422, 424 are exposed to the high temperature conditions existing in gasifier 400, it is possible to utilize conventional, low-temperature steel pipe to form such side wall tuyeres 420, 422, 424 by providing a flow using a blower or other means, not shown, as a coolant, such as air or water, through the flutes when gasifier 400 is operational to thereby avoid the need for using expensive, special high temperature alloys in the construction of such side wall tuyeres 420, 422, 424. Alternatively, windboxes may be located along the perimeter inside gasifier to confine the pile to a tighter area to maintain optimum air distribution, better combustion, and ash recovery. An orifice ring or constriction may be inserted into each pipe to accurately control the airflow within and between air nozzles.

The oxidation of the feed material in gasifier 400 requires a source of oxygen, and ambient air has been found to be a suitable source for this purpose. An air blower 411 of standard construction is used to provide ambient air to gasifier 400, the air being introduced into the interior of the pile P of feed material through the nozzles and injection points located within, around and between the feed cones 450 and to the auxiliary row, or rows of spaced-apart series of horizontally and or sloped, inward projections, flutes or tuyeres 413 in the surrounding walls of gasifier 400. Where necessary, air nozzles can be covered with cover plates or caps to avoid back flow and blocking of the openings by feed material and ash.

The moving bed of ash 410, or hearth, of gasifier 400 has a peripheral shape defined by an insulated wall 401 and, in the preferred embodiment, the insulated wall 401 is arranged to define a square or rectangular gasifier 400. Moving bed of ash 410 lies above bottom 403 of gasifier 400, below the plane defined by lower opening 454 of feed cone 450, and is formed of slowly moving solid by-products of combustion. In this arrangement, solid incombustibles and ash will accumulate below precombusted feed material, and limit precombusted feed material in gasifier 400 from exiting via clean out assembly 500. At the same time, any incombustible contaminants that normally work their way to the bottom of the pile P as the oxidation process continues will be able to accumulate and build up the moving bed 410. Incombustibles may be employed to take advantage of the insulating characteristics of said ash and incombustibles. Excess ash and incombustibles will collect in the trench(es) 501, i.e. retention basin(s), which lie below bottom 403 of gasifier 400. A single trench 501 may be located at the center of the bottom of gasifier 400, or a pair of trenches may employed so that a trench 501 is provided adjacent each respective opposed sides of gasifier 400. As the ash and incombustibles collect, the elevation of the moving ash bed 410 rises.

In the preferred embodiment, the control of elevation and shape of moving ash bed 410 is handled by at least one ash auger pair 502 located within trench 501. Each auger of auger pair 502 is single or double supported, and may be of conical design or feature progressive helical flights so as to remove the material in a manner whereby the uneven accumulation across the floor and along the auger can be controlled. Ash auger pair 502 resides completely within trench 501 such that the augers are closely adjacent each other, and so that the upper periphery of the augers are flush with bottom 403 of gasifier 400. The augers of ash auger pair 502 counter rotate, that is, rotate towards each other, at the same speed.

Trench 501 is provided in a depth which is approximately the diameter of an auger, and is provided in a width that is slightly greater than twice the diameter of an auger so that minimal clearance is provided between the augers and trench 501. Trench 501 may be rectangular in section as shown in FIG. 1A, or may be contoured to reflect the shape of the augers as shown in FIG. 1B. Where there exists potential for exposure to excess temperatures in the trenches, auger pair 502 may be air, water or oil cooled in order to properly and safely convey the ash towards the point, or points, of discharge 504 suitably located in the bottom of the trench 501 at about the middle, or alternatively at the end of the trench to wherein they are connected to a bin or a conveyor (not shown) of suitable design for further disposal.

In a second embodiment, the control of elevation and shape of moving ash bed 410 is handled by a single auger 502' located within trench 501' (FIG. 1C). Auger 502' is single or double supported, and may be of conical design or feature progressive helical flights so as to remove the material in a manner whereby the uneven accumulation across the floor and along the auger can be controlled. Auger 502' resides completely within trench 501' such that auger 502' generally fills trench 501' and so that the upper periphery of auger 502' is flush with bottom 403 of gasifier 400. Trench 501' is identical in concept to trench 501, scaled to be sized for a single auger.

Probes 506 are used to monitor the level of moving ash bed 410 defined by the upper elevation of the accumulated ash. Probes 506 are suitable for measurement of differences in characteristics of the ash. As an example of probes 506, there are used thermo elements in pairs located one above the other, distanced sufficiently such that the level of the moving ash bed 410 will be in between them, and capable of characterization by the difference in temperatures and the temperature of the material above the moving ash bed 410 while in operation. Said temperature difference will then be the offset that will dictate the degree of auger 502 movement required to control the level of the moving ash bed 410 between the probes. In this representation, it is assumed that gasifier 400 is equipped with several sets of probes 506 around the perimeter of the chamber and an average of probe 506 input data will determine the auger 502 movements.

To bring gasifier 400 to an operational condition on start up, the feed assembly 300 is activated to form the pile P of feed material gasifier bottom 403 in preparation of development of a "moving ash bed" 410 above bottom 403. The pile P of feed material is ignited, for example, manually, wherein a portion 401a of the wall 401 of gasifier 400 is removable from the remaining portion of the wall 401 to facilitate the igniting of the pile P, and/or to permit the inspection and/or cleaning of gasifier 400 when it is non-operational. To facilitate the removal of the removable portion 401a of the wall 401, the removable portion 401a may be mounted on a swing-out arm assembly (not shown). To facilitate bringing the pile P of feed material up to its normal operating temperature, fuel oil or other readily combustible supplemental fuel may be added to it. As an example, this may be done manually through the opening provided when the removable portion 401a is removed.

While the air disperses up through the pile of feed material P in gasifier 400, it will support slow oxidation and progressively enrich the gaseous effluent with combustible components. Slow oxidation and combustion is facilitated by the heat created from the combustion and supported by auxiliary air entering through start up tuyeres 420 on the walls 401 and by the radiant heat reflected from the roof 404. Stable combustion has been established when the pile P of feed material is burning at the desired low temperature profile of about 1000 degrees F. During stable combustion, injected air from perimeter tuyere arrays 422, 424 on walls 401, as well as from feed cone tuyeres arrays 466, 468, serve to create the circulation required to maintain uniform heating and combustion of the pile P and minimize channeling and stratification in the stream of gaseous combustibles leaving gasifier 400. Temperature within enclosure 402 of gasifier 400 will vary depending on the type of feed material, and will remain oxygen starved. For example, it is possible to have an enclosure temperature of 2000 degrees F. with no oxygen present.

The gaseous effluent leaving gasifier 400 leaves through the insulated exit duct 412 from where it passes into the recovery and regeneration chamber 600, in effect an insulated duct, defined by a wall 607, through which the partially oxidized gaseous material is withdrawn from gasifier 400 ("product gas") is given the residence time at elevated temperatures. The objective is to increase the cracking and decomposition leading to the formation and enrichment of the "product gas" with additional gaseous combustibles from high molecular residues, droplets and or solids that may be entrained in the gaseous material from gasifier 400. The recovery and regeneration chamber 600 is fitted with sets of injection nozzles 606, for delivery of the oxidizing agent, which typically may be air or oxygen or a mixture thereof. The nozzles 606 connect to manifolds 605 that may be in the shape of ring formed wind boxes all connected through links 604, with individual isolation valves 603 and individual airflow measuring devices 602 to a common duct 601 that receives the oxidizing agent. When ambient air is satisfactory for use as the oxidant it may be provided to the common duct 601 by means of a blower 610, of conventional design (not shown). The injection nozzles 606 may be grouped to function individually or in unison. For example, it may be desirable to impart a swirl motion to the flowing stream of gaseous combustibles in which event the nozzles 606 are arranged so as to point tangentially from the inside surface of the recovery and regeneration chamber wall, without being necessarily perpendicular, onto an imaginary circle, clock- or anti clockwise, and thereby promote the desirable swirl motion and resultant mixing.

With this system of injection nozzles 606 it is possible to add sufficient oxidizing agent to partly or completely combust any or all of the gaseous combustibles in the stream flowing through the residence chamber 600. By applying a partial, i.e. a sub-stoichiometric portion of oxidizing agent, combustion it will be possible to elevate the residence temperature promoting the reaction rates of decomposition of said entrainment. Alternatively, a complete combustion will be achieved by administrating the oxidizing agent in excess of the stoichiometric requirement. As a result the residual flue gas will be even hotter which is most desirable when the application of the gasification process is to generate, for example, steam or hot water, or as the case may be, hot air for power generation via an air turbine driven turbine. The system of injection nozzles will serve to apply the minimum excess of oxidizing agent thereby maximizing the flue gas temperature and the thermal efficiency of the overall system. In this mode, the recovery and regeneration section will form the bulk of the oxidation and burn out of combustibles leaving little work to be done by the oxidizer, described infra.

The gaseous effluent leaving recovery and regeneration chamber 600 passes into oxidizer 700. Oxidizer 700 is defined by an insulated wall and, in the preferred embodiment, the insulated wall is arranged to define a oxidizer which is in the form of a cylinder whose longitudinal axis is coextensive with the longitudinal axis of recovery and regeneration chamber 600. A secondary oxidant may be added to oxidizer 700 to burn or completely oxidize gaseous materials flowing into oxidizer 700 via regenerative chamber 600. Ambient air is satisfactory for use as the secondary oxidant and may be provided to oxidizer 700 by means of a second blower 702, of conventional design. Preferably, the second blower 702 is arranged with an air duct 703 and a wind box 704 with its outlet 705 entering oxidizer 700 in a direction that is tangential to the wall that defines oxidizer 700. With this arrangement, a swirling or cyclonic action will develop within oxidizer 700 by virtue of the tangential admission of secondary air through the blower 702, and solid particles which are carried into oxidizer 700 will be driven to the outermost portions of oxidizer 700 by centrifugal force resulting from this swirling action and may be removed from oxidizer 700 by means of a radial port 706 at the bottom of the oxidizer 700. Solid particles leaving oxidizer 700 through the radial port 706 may be collected and taken away to a storage and disposal location. Sufficient air is added to oxidizer 700 by means of the second blower 702 to fully oxidize the partially oxidized gaseous materials entering oxidizer 700 from the insulated exit of recovery and regeneration chamber 600. Preferably excess air is added to oxidizer 700 to prevent excessively high temperatures from developing therein.

In a preferred embodiment of the operation of the apparatus according to the present invention, the temperature in oxidizer 700 should be limited to no more than 2800° F. This can be accomplished by utilizing total air added to the system, including the air added to gasifier 400 by the air blower 411, by the air that may be added by blower 610, and the air that may be added to the oxidizer 700 by the second blower 702, in an amount which exceeds the stoichiometric equivalent of that required for full oxidation of the feed material added to gasifier 400. The fully oxidized, high-temperature flue gas exits from oxidizer 700 as an effluent through an insulated duct 710 and passes into a heat exchanger such as a steam boiler 800 (not shown). Steam boiler 800 may be considered to be of conventional construction, and uses the effluent as the source of heat for heating water therein as a substitute for the flue gas from an oil or gas burner that is usually used in conjunction with such steam boiler 800.

The recovery and regeneration/oxidizer arrangement may be combined onto a single oxidizer compartment sized to provide adequate residence time for complete burn out of all combustibles arriving from one or more gasifier(s) 400. In this arrangement, the oxidizer compartment can be a horizontal or vertical vessel with an excess stack on top and a conical bottom. The conical bottom includes a smelt tap in the event smelts are formed and accumulated during operation. Preferably, an auxiliary burner is inserted in the recovery and regeneration/oxidizer train to ensure initial ignition of combustible gases.

Side walls 401 of gasifier 400 are provided in a polygonal, preferably rectangular, configuration so as to overcome capacity limitations of prior art gasifier designs. Specifically, by using linear side walls the gasifier design is easily expanded. That is, side-by-side assembly of multiple gasifier units allows accommodation of increased volumes of through-put with minimal increased consumption of floor space. Referring now to FIG. 3, the inventive gasifier 400 is shown enlarged (400') by extending the inventive concept within the apparatus in both directions, providing greater gasifier throughput. Plural feed assemblies 300 transport feed material between storage hopper 200 and enlarged gasifier 400'. Gasifier 400' is provided with plural sets of linearly aligned feed cones 450, each set of feed cones 450 corresponding to and in alignment with a feed assembly 300. Plural ash clean out assemblies 500 are provided. Each ash clean out assembly 500 is elongated to extend across the enlarged enclosure 402', and is oriented in a direction perpendicular to that of feed assemblies 300. The number of ash clean out assemblies 500 provided is sufficient to generally cover the bottom 403' of gasifier 400', and the ash clean out assemblies are positioned to extend between adjacent feed cones 450, or to extend between outer feed cones 450 and side wall 401'. A single exit duct 412' is used to deliver gaseous effluent to downstream components of the system.

Method

In accordance with the present invention, there is provided a relatively simple method for the recovery of energy from feed stock of biomass such as forestry and agricultural residues, and from industrial waste materials such as pulp and paper products, hydrocarbon based plastic, poultry litter, sludges and the like, by the sub-stoichiometric gasification of such materials within the inventive gasifier 400 and employment of the system described above. The method of using gasifier 400 and the system, described above, to gasify solid organic material to produce a gaseous effluent and solid residue is as defined in the following method steps:

Step 1. Provide a supply of fuel. In the preferred embodiment, the fuel is solid organic material. The fuel is stored generally adjacent to gasifier 400. Preferably, the fuel is stored in a hopper-style level controlled metering bin 200 with an opening 201 in a lower portion thereof to provide easy distribution of the fuel from hopper 200.

Step 2. Transfer fuel from hopper 200 to gasifier 400. Preferably, feed assembly 300 is provided so that fuel exiting hopper 200 via opening 201 is transported using a generally horizontal screw member 301 to a generally vertical screw member 303, and then from screw member 303 into gasifier 400 via an opening the bottom of gasifier 400.

Fuel is transferred to gasifier 400 at a load demand controlled rate typically within a 50 percent turndown capacity. Use feed cone assemblies 450 adjacent vertical screw member 303 to direct solid organic material upward and outward within gasifier 400 so as to provide a fuel pile within gasifier 400 having a generally flat upper surface and of generally constant depth.

Step 3. Use sensing means to monitor and control pile height within gasifier 400. During normal operation, the sensing means is used to maintain the pile at a generally constant level. In the preferred embodiment sensing means comprises the pair of infrared light beam and sensor units 426, 428.

Step 4. Provide an oxidant to gasifier 400 to aid in generation and control of combustion and to provide a gaseous effluent to facilitate partial primary oxidation of the fuel in gasifier 400 by partial combustion of those materials. Preferably, during start up oxidant is added to gasifier 400 using tuyere array 420. After startup is complete, tuyere array 420 is shut off.

Sidewall tuyere arrays 422, 424 and feed cone tuyere arrays 466, 468 provide oxidant to gasifier 400 during normal operation. Add oxidant gasifier 400 using sidewall tuyere arrays 422, 424 and feed cone tuyere arrays 466, 468 at a rate that is insufficient to fully oxidize the fuel, such that combustion of the fuel is partial, resulting in a gaseous effluent and solid by-products of combustion. Oxidant is continuously added to gasifier 400 to continuously partially gasify the fuel in the mass with the result that solid by products of combustion including solid residue are accumulated to form a supporting moving bed of ash 410 for supporting the fuel within the gasifier and for assisting the excess solids to be transferred out of gasifier 400.

The moving bed of ash 410 supports and maintains the fuel on an upper surface of the moving bed of ash 410 during oxidation of the solid organic materials within the gasifier. The moving bed of ash 410 has a depth which provides insulation and protection against heat damage between the oxidizing fuel pile and the gasifer bottom 403 and its associated assemblies, such as ash clean out assembly 500. The moving bed of ash 410 provides quiet removal, and prevents bridging, of the fuel.

Combustion of the fuel is provided in starved air conditions such that the fuel pile has a low (less than 1500 degrees F.) temperature profile. The gasifier temperature will vary depending on the air-to-fuel ratio as well as the rate at which the fuel is combusted.

Step 5. Remove continuously the solid by-products of combustion and solid residues from the lower portion of gasifier 400 using ash clean out assembly 500. Clean out assembly 500 moves the solid by-products of combustion and solid residues so as to aid in fuel pile movement, to aid in aeration of the fuel pile, to aid in generation and maintenance of the flat upper surface of the fuel pile, and to transfer excess accumulations of solid by products of combustion out of gasifier 400, resulting in the movement of the moving ash bed hearth.

Step 6. Provide an effluent path of flow within gasifier 400 for a first portion of the gaseous effluent to migrate, mix, and react through the heated fuel pile.

Provide a path of flow for any excess solid residue or by-products of combustion, that is residues and solids which are in excess of the moving bed of ash 410, so that these excess solid residue or by-products of combustion are transferred out of gasifier 400 using clean out assembly 500. Preferably, material enters and exits gasifier 400 at generally the same rate so that the optimal height of the fuel pile is maintained at a generally constant level.

Step 7. Direct any gaseous effluent that is generated and transferred out of the gasifier 400 via duct 412 to recovery and regeneration chamber 600.

Step 8. Add an oxidant to recovery and regeneration chamber 600 to oxidize other portions of the gaseous effluent not so oxidized, into additional gaseous effluent. In the preferred embodiment, this oxidant is air. However, it is well within the scope of this invention to use other oxidants, including, but not limited to, combustion flue gas. In the preferred embodiment the temperature of the oxidant is ambient, but the oxidant may also be preheated if required by the specific application.

Step 9. Direct all gaseous effluent from recovery and regeneration chamber 600 to oxidizer 700.

Step 10. Add an oxidant to oxidizer 700 to further oxidize any gaseous effluent not so oxidized, into essentially fully oxidized gaseous effluent, and transferring the essentially fully oxidized gaseous effluent out of oxidizer 700. In the preferred embodiment, this oxidant is air. However, it is well within the scope of this invention to use other oxidants, including, but not limited to, combustion flue gas. In the preferred embodiment the temperature of the oxidant is ambient, but the oxidant may also be preheated if required by the specific application.

Step 11. Direct all essentially fully oxidized gaseous effluent from oxidizer 700 to a heat recovery device 800. In the preferred embodiment, this devices comprises a steam boiler. However, it is well within the scope of this invention to use other heat recovery devices, including, but not limited to, hot water, hot oil, or hot air heat exchangers.

What is claimed is:

1. A gasifier for a system for gasifying solid organic materials, said gasifier comprising:
(I) a housing, said housing having a bottom portion and an upper portion;

(II) four side walls supported by the bottom portion and attached to the upper portion, there being present a first opening in one side wall for removing gaseous effluent, (III) located in first opening, a device for removing gaseous effluent from the gasifier;

(IV) a second opening in the housing for supporting a device for sensing the elevation of the top of any mass of solid organic material contained therein, (V) located in said second opening, a device for sensing the elevation of the top of any mass of solid organic material contained in the gasifier;

(VI) at least one third opening for supporting a device for determining the characteristics of any ash created within the gasifier;

(VII) located in said third opening, a device for determining the characteristics of any ash created within the gasifier;

(VIII) at least one fourth opening located in a side wall for supporting at least one device for providing an oxidant to the solid organic materials;

(IX) located in said fourth opening, a device for providing an oxidant to the gasifier;

(X) a bottom portion, said bottom portion being a floor for the gasifier, the floor having a top surface and a bottom surface, and the floor having at least one opening therethrough to allow the movement of solid organic material into the gasifier, wherein the upper surface of the floor has a retaining wall on the outside of each of the openings to form retention basins to retain the solid organic materials in the bottom of the gasifier to form a floorless hearth, (XI) said gasifier containing at least one device for providing solid organic materials through each floor opening and into the gasifier;

(XII) a device for heating the solid organic materials while above the retention basin;

(XIII) an opening in the bottom portion and through at least one side wall of the gasifier to allow for the movement of non-combustibles out of the gasifier, and, (XIV) a device in each of the retention basins for removing non-combustible materials out of the gasifier and controlling the elevation and shape of the floorless hearth.

2. A gasifier as claimed in claim 1 wherein the gasifier has a shape selected from the group consisting of:
   i cubic and
   ii hexahedral.

3. A gasifier as claimed in claim 2 wherein the hearth pattern is selected from the group consisting of:
   i square and
   ii rectangular.

4. A gasifier as claimed in claim 3 wherein the upper portion is a roof and the configuration of the roof is selected from the group consisting of:
   i vaulted,
   ii tapered, and
   iii flat.

5. A system for gasifying solid organic materials, said system comprising:
   A. a supply hopper for solid organic materials;
   B. a gasifier having a primary oxidation chamber;
   C. a device for moving solid organic materials from the hopper to the gasifier;
   D. a device for heating the solid organic material in the primary oxidation chamber;
   E. a recovery and regeneration chamber;
   F. a device for moving any gaseous effluent formed in the gasifier to the recovery and regeneration chamber;
   G. a device for removing non-combustible material out of the gasifier, wherein the gasifier is a gasifier as claimed in claim 2.

6. An apparatus for gasification of solid fuel including biomass and other solid wastes, the apparatus comprising
   a housing, a fuel feed means, an ash removal means, and means for venting gaseous effluent, wherein
   the housing comprises a closed ceiling, a closed bottom, and at least four side walls extending between the ceiling and the bottom,
   the fuel feed means comprises a fuel storage hopper, a fuel feed auger system, and at least one feed cone,
   the fuel feed auger system comprising at least one auger, the fuel feed auger system transporting the fuel from the storage hopper to the housing,
   the at least one feed cone residing within the housing generally adjacent the bottom of the housing, the at least one feed cone comprising a shape which is a tapered channel, the at least one feed cone having
   an inner surface sloped at a first angle,
   an outer surface sloped at a second angle,
   an upper opening,
   a lower circular opening,
   the at least one auger of the fuel feed auger system terminating within the lower circular opening of the at least one feed cone.

7. The apparatus of claim 6 wherein the ash removal means comprises at least two augers, the at least two augers extending in a first horizontal plane, the first horizontal plane lying below a second horizontal plane, the second horizontal plane defined by the plane in which the lower circular opening lies,
   the ash removal means and fuel feed auger system working simultaneously, continuously, and in concert such that the fuel transferred into the apparatus forms a fuel pile having a generally flat upper surface and having a generally constant height.

8. The apparatus of claim 7 wherein the ash removal means comprises a trench in which the at least two augers reside, the trench sized such that each auger of the at least to augers resides side by side in close adjacentcy within the trench and such that there is minimal clearance between the trench and the at least two augers.

9. The apparatus of claim 8 wherein the housing comprises sensing means for monitoring and controlling the amount of fuel within the housing.

10. The apparatus of claim 9 wherein the fuel pile within the housing is supported by a hearth comprising a moving bed of ash.

11. The apparatus of claim 10 wherein the upper opening defines a third horizontal plane and the generally flat upper surface of the fuel pile resides generally within a fourth horizontal plane, wherein the fourth horizontal plane overlies the third horizontal plane, the third horizontal plane overlying the second horizontal plane.

12. The apparatus of claim 6 wherein the hearth comprising a moving bed of ash generally comprises a fifth horizontal plane,
   the fifth horizontal plane lying below the second horizontal plane,
   the fifth horizontal plane lying above the first horizontal plane,
   the distance between the fifth horizontal plane and the first horizontal plane is such that the ash removal means is insulated from heat damage resulting from combustion of fuel upon the moving bed of ash hearth.

13. The apparatus of claim 6 wherein the first angle is in the range of 35 to 55 degrees.

14. The apparatus of claim 11 wherein the second angle is in the range of 60 to 90 degrees.

15. The apparatus of claim 12 wherein the housing is provided with at least one array of tuyeres formed in the side walls thereof, the tuyeres comprising elongate tubes for injecting oxidant into the interior of the housing.

16. The apparatus of claim 12 wherein the feed cone is provided with at least one array of tuyeres formed in the inner surface and with at least one array of tuyeres formed in the outer surface.

17. A system for gasification of solid waste for disposal of solid waste and recovery of heat energy, the system comprising a gasifier, an oxidizer, and a heat recovery device,
    wherein the solid waste undergoes partial primary combustion within the gasifier, the partial primary combustion of the solid wasted resulting in gasifier combustion flue gas and solid residues,
    wherein the gasifier combustion flue gas is directed to an oxidizer for secondary oxidation, the secondary oxidation resulting in an oxidizer flue gas,
    wherein the oxidizer flue gas is directed to a heat recovery device so that heat energy can be recovered from the oxidizer flue gas for useful application,
    wherein the gasifier comprises a housing having a top, a bottom, and at least four side walls extending between the top and bottom, the gasifier comprising fuel input means and solid residue removal means,
    wherein the solid waste undergoes partial primary combustion while supported by a moving bed of ash hearth within the gasifier, the moving bed of ash hearth generated and maintained within the gasifier by interaction between the fuel input means and the solid residue removal means.

* * * * *